(12) United States Patent
Wang et al.

(10) Patent No.: US 11,388,550 B2
(45) Date of Patent: Jul. 12, 2022

(54) POSITIONING METHOD AND APPARATUS

(71) Applicant: HUAWEI TECHNOLOGIES CO., LTD., Guangdong (CN)

(72) Inventors: Yi Wang, Shanghai (CN); Bin Hu, Shanghai (CN); Xiaodong Xu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 49 days.

(21) Appl. No.: 16/785,042

(22) Filed: Feb. 7, 2020

(65) Prior Publication Data
US 2020/0178038 A1    Jun. 4, 2020

Related U.S. Application Data

(63) Continuation of application No. PCT/CN2018/099336, filed on Aug. 8, 2018.

(30) Foreign Application Priority Data

Aug. 11, 2017   (CN) .......................... 201710685066.2

(51) Int. Cl.
*H04W 4/029*      (2018.01)
*G01S 5/02*       (2010.01)

(52) U.S. Cl.
CPC ........... *H04W 4/029* (2018.02); *G01S 5/0215* (2013.01); *G01S 5/0221* (2013.01)

(58) Field of Classification Search
CPC ..... H04W 64/00; H04W 24/08; H04W 88/08; H04W 4/029; H04W 4/023; H04W 16/28;
(Continued)

(56) References Cited

U.S. PATENT DOCUMENTS 7,577,445 B2    8/2009 Guvenc et al.
2013/0288705 A1   10/2013 Ahn et al.
(Continued)

FOREIGN PATENT DOCUMENTS

CN       1920593 A  *  2/2007
CN      101282577 A    10/2008
(Continued)

OTHER PUBLICATIONS

Translation of CN106950528A, Liu et al. Jul. 14, 2017 (Year: 2017).*

(Continued)

*Primary Examiner* — Matthew C Sams
(74) *Attorney, Agent, or Firm* — Womble Bond Dickinson (US) LLP

(57) ABSTRACT

This application provides a positioning method and apparatus. The method includes: obtaining, by a positioning apparatus, information about a transmission environment of each channel in a plurality of channels for a terminal device; determining, by the positioning apparatus, a target channel from the plurality of channels based on the information about the transmission environment of each channel; and locating, by the positioning apparatus, the terminal device based on positioning measurement information of the target channel. The positioning method and apparatus provided in this application helps improve positioning accuracy.

12 Claims, 4 Drawing Sheets

(58) Field of Classification Search
CPC ........ G01S 5/14; G01S 5/0273; G01S 5/0221; G01S 5/0205; G01S 5/0284; G01S 5/0257
See application file for complete search history.

(56) References Cited

U.S. PATENT DOCUMENTS

| | | | |
|---|---|---|---|
| 2014/0062793 A1 | 3/2014 | Alsindi et al. | |
| 2014/0329520 A1* | 11/2014 | Militano | H04W 24/08 455/422.1 |
| 2015/0219750 A1* | 8/2015 | Xiao | G01S 5/0215 342/451 |
| 2015/0245311 A1 | 8/2015 | Wang et al. | |
| 2016/0020876 A1* | 1/2016 | Raghavan | H04W 76/10 370/252 |
| 2016/0249316 A1 | 8/2016 | Kudekar et al. | |
| 2016/0365904 A1 | 12/2016 | Sayeed | |
| 2018/0205442 A1* | 7/2018 | Oteri | H04B 7/0417 |
| 2018/0324738 A1* | 11/2018 | Stirling-Gallacher | G01S 5/0036 |
| 2019/0182793 A1* | 6/2019 | Wang | H04B 7/06 |

FOREIGN PATENT DOCUMENTS

| | | | |
|---|---|---|---|
| CN | 101472330 A | 7/2009 | |
| CN | 101483805 A | 7/2009 | |
| CN | 102088769 A | 6/2011 | |
| CN | 103399297 A | 11/2013 | |
| CN | 104812061 A | 7/2015 | |
| CN | 104869585 A | 8/2015 | |
| CN | 104981012 A * | 10/2015 | |
| CN | 105554882 A | 5/2016 | |
| CN | 105979583 A | 9/2016 | |
| CN | 103841640 B * | 4/2017 | |
| CN | 106937378 A | 7/2017 | |
| CN | 106950528 A * | 7/2017 | |
| WO | WO-2015135780 A1 * | 9/2015 | ........... H04L 5/0044 |
| WO | 2016179202 A1 | 11/2016 | |
| WO | WO-2018183571 A1 * | 10/2018 | ............. G01S 13/82 |

OTHER PUBLICATIONS

3GPP TR 38.901 V14.1.1 (Jul. 2017),3rd Generation Partnership Project;Technical Specification Group Radio Access Network;Study on channel model for frequencies from 0.5 to 100 GHz(Release 14),Total 90 Pages.

Liu Liu et al., Research on the propagation condition and channel capacity for Massive MIMO. Journal of Beijing Jiaotong University, vol. 39, No. 2, Apr. 2015, 11 pages.

* cited by examiner

POSITIONING METHOD AND APPARATUS

CROSS-REFERENCE TO RELATED APPLICATIONS

This application is a continuation of International Application No. PCT/CN2018/099336, filed on Aug. 8, 2018, which claims priority to Chinese Patent Application No. 201710685066.2, filed on Aug. 11, 2017. The disclosures of the aforementioned applications are hereby incorporated by reference in their entireties.

TECHNICAL FIELD

This application relates to the communications field, and more particularly, to a positioning method and apparatus in the communications field.

BACKGROUND

With continuous development of a mobile communications system, accurate positioning has become an important part of wireless technologies. In the prior art, a terminal device or a network device may send positioning measurement information, such as a time of arrival (TOA) and/or a direction of arrival (DOA), of a channel between the terminal device and the network device to an enhanced serving mobile location center (E-SMLC), and the E-SMLC locates the terminal device based on the positioning measurement information of the channel.

However, the accuracy of locating a terminal device in the prior art is comparatively low.

SUMMARY

This application provides a positioning method and apparatus, to help improve positioning accuracy.

According to a first aspect, this application provides a positioning method. The method includes:

obtaining, by a positioning apparatus, information about a transmission environment of each channel in a plurality of channels for a terminal device;

determining, by the positioning apparatus, a target channel from the plurality of channels based on the information about the transmission environment of each channel; and locating, by the positioning apparatus, the terminal device based on positioning measurement information of the target channel.

According to the positioning method provided in this embodiment of this application, the positioning apparatus selects the target channel from the plurality of channels based on the obtained information about the transmission environment of each channel in the plurality of channels, and locates the terminal device based on the positioning measurement information of the target channel. This helps improve positioning accuracy.

It should be understood that, in this embodiment of this application, for a network device corresponding to a channel, the terminal device may communicate with the network device over the channel.

In one embodiment, any two of the plurality of channels may correspond to a same network device or different network devices. In other words, the plurality of channels may include channels established between the terminal device and different cells of the same network device, or the plurality of channels may include channels established between the different network devices and the terminal device. This is not limited in this embodiment of this application.

In one embodiment, the positioning apparatus may be a functional module integrated into the terminal device or the network device, or the positioning apparatus may be an apparatus independent of the terminal device and the network device. This is not limited in this embodiment of this application.

In one embodiment, when the positioning apparatus is an apparatus independent of the terminal device and the network device, the positioning apparatus may receive the information about the transmission environment of each channel from the terminal device or the network device.

In one embodiment, when the positioning apparatus is a functional module integrated into the terminal device or the network device, the positioning apparatus may obtain the information about the transmission environment of each channel from the terminal device or the network device in which the positioning apparatus is located.

In one embodiment, transmission environments of the plurality of channels include line-of-sight (LOS) transmission and non-line-of-sight (NLOS) transmission, and the determining, by the positioning apparatus, a target channel from the plurality of channels based on the information about the transmission environment of each channel includes: determining, by the positioning apparatus, a channel in the plurality of channels whose transmission environment is LOS as the target channel.

It should be understood that, that a transmission environment is LOS in this embodiment of this application means that a radio signal can be transmitted between a transmit end and a receive end in a "straight line" without an obstruction. In other words, there is a direct path between the transmit end and the receive end.

It should further be understood that, that a transmission environment is NLOS in this embodiment of this application means that due to an obstruction, some radio signals directly arrive at a receive end, and some radio signals need to pass along a path of reflection, scattering, diffraction, or the like to arrive at the receive end. In other words, there is the obstruction in a path between a transmit end and the receive end.

In one embodiment, in an uplink transmission scenario, the transmit end is a terminal device, and the receive end is a network device; in a downlink transmission scenario, the transmit end is a network device, and the receive end is a terminal device. This is not limited in this embodiment of this application.

In one embodiment, transmission environments of the plurality of channels include near LOS and at least one of near NLOS and NLOS, and the determining, by the positioning apparatus, a target channel from the plurality of channels based on the information about the transmission environment of each channel includes: determining, by the positioning apparatus, a channel in the plurality of channels whose transmission environment is near LOS as the target channel.

It should be understood that a transmission environment of a LOS channel is better than that of a near LOS channel, a transmission environment of the near LOS channel is better than that of a near NLOS channel, and a transmission environment of the near NLOS channel is better than that of an NLOS channel.

According to the positioning method provided in this embodiment of this application, the positioning apparatus uses a channel in the plurality of channels that has a comparatively good transmission environment as the target channel, and locates the terminal device based on the positioning measurement information of the target channel, so that positioning accuracy can be improved.

In one embodiment, before the obtaining, by a positioning apparatus, information about a transmission environment of each channel in a plurality of channels for a terminal device, the method further includes: sending, by the positioning apparatus, a first request message to the terminal device or a network device corresponding to each channel in the plurality of channels, where the first request message is used to request the information about the transmission environment of each channel; and the obtaining, by a positioning apparatus, information about a transmission environment of each channel in a plurality of channels for a terminal device includes: receiving, by the positioning apparatus, a first feedback message from the terminal device or the network device corresponding to each channel in the plurality of channels, where the first feedback message is determined based on the first request message, and the first feedback message carries the information about the transmission environment of each channel.

In one embodiment, before the locating, by the positioning apparatus, the terminal device based on positioning measurement information of the target channel, the method further includes: obtaining, by the positioning apparatus, positioning measurement information of at least one channel in the plurality of channels, where the at least one channel includes the target channel.

In one embodiment, before the obtaining, by the positioning apparatus, positioning measurement information of at least one channel, the method further includes: sending, by the positioning apparatus, a second request message to the terminal device or a network device corresponding to each of the at least one channel, where the second request message is used to request a location of the terminal device; and the obtaining, by the positioning apparatus, positioning measurement information of at least one channel in the plurality of channels includes: receiving, by the positioning apparatus, a second feedback message from the terminal device or the network device corresponding to each of the at least one channel, where the second feedback message is determined based on the second request message, and the second feedback message carries positioning measurement information of each of the at least one channel.

In one embodiment, the positioning apparatus may first request the information about the transmission environment of each channel in the plurality of channels from the network device corresponding to each channel in the plurality of channels or the terminal device, select the target channel from the plurality of channels based on the information about the transmission environment of each channel in the plurality of channels, then request the positioning measurement information of the target channel from the network device corresponding to the target channel or the terminal device, and locate the terminal device based on the positioning measurement information of the target channel.

In one embodiment, the positioning apparatus may simultaneously request the information about the transmission environment and positioning measurement information of each channel in the plurality of channels from the network device corresponding to each channel in the plurality of channels or the terminal device, select the target channel from the plurality of channels based on the information about the transmission environment of each channel in the plurality of channels, and locate the terminal device based on the positioning measurement information of the target channel.

According to the positioning method provided in this embodiment of this application, the positioning apparatus simultaneously requests the positioning measurement information and the information about the transmission environment of each channel, or simultaneously feeds back the positioning measurement information and the information about the transmission environment of each channel, so that signaling overheads can be reduced.

In addition, according to the positioning method provided in this embodiment of this application, the positioning apparatus first requests the information about the transmission environment of each channel in the plurality of channels, selects the target channel from the plurality of channels based on the information about the transmission environment of each channel, then requests the positioning measurement information of the target channel, and locates the terminal device based on the positioning measurement information of the target channel, so that signaling overheads can also be reduced.

According to a second aspect, this application provides a positioning method. The method includes:

determining a transmission environment of a channel between a terminal device and a network device; and sending information about the transmission environment of the channel to a positioning apparatus.

In one embodiment, the method may be performed by the terminal device or the network device. This is not limited in this embodiment of this application.

According to the positioning method provided in this embodiment of this application, a communications device determines the transmission environment of the channel between the terminal device and the network device, and reports the information about the transmission environment to the positioning apparatus, so that the positioning apparatus locates the terminal device based on the information about the transmission environment of the channel. This helps improve positioning accuracy.

In one embodiment, the determining a transmission environment of a channel between a terminal device and a network device includes: obtaining a difference between a direction of arrival (DOA) of a high frequency signal and a DOA of a low frequency signal on the channel; and determining the transmission environment of the channel based on the difference.

In one embodiment, the determining the transmission environment of the channel based on the difference includes: if the difference is less than or equal to a first preset value, determining that the transmission environment of the channel is LOS; or if the difference is greater than the first preset value, determining that the transmission environment of the channel is NLOS.

In one embodiment, the determining the transmission environment of the channel based on the difference includes: if the difference is less than or equal to a first preset value, determining that the transmission environment of the channel is LOS; if the difference is greater than the first preset value and is less than or equal to a second preset value, determining that the transmission environment of the channel is near LOS, where the second preset value is greater than the first preset value; if the difference is greater than the second preset value and is less than or equal to a third preset value, determining that the transmission environment of the channel is near NLOS, where the third preset value is greater than the second preset value; or if the difference is greater than the third preset value, determining that the transmission environment of the channel is NLOS.

In one embodiment, before the sending information about the transmission environment of the channel to a positioning apparatus, the method further includes: receiving a first request message sent by the positioning apparatus, where the first request message is used to request the information about the transmission environment of the channel; the sending information about the transmission environment of the channel to a positioning apparatus includes: sending a first feedback message to the positioning apparatus based on the first request message, where the first feedback message carries the information about the transmission environment of the channel.

In one embodiment, the method further includes: determining positioning measurement information of the channel, where the positioning measurement information is used to locate the terminal device; and sending the positioning measurement information to the positioning apparatus.

In one embodiment, before the sending the positioning measurement information of the channel to the positioning apparatus, the method further includes: receiving a second request message sent by the positioning apparatus, where the second request message is used to request a location of the terminal device; and the sending the positioning measurement information of the channel to the positioning apparatus includes: sending a second feedback message to the positioning apparatus based on the second request message, where the second feedback message carries the positioning measurement information of the channel.

In one embodiment, the positioning measurement information includes a DOA and/or a time of arrival TOA.

According to a third aspect, this application provides a positioning apparatus, configured to perform the method according to any one of the first aspect or the embodiments of the first aspect.

In one embodiment, the apparatus may be integrated into a terminal device or a network device, or the apparatus may be independent of the terminal device and the network device. This is not limited in this embodiment of this application.

According to a fourth aspect, this application provides a positioning apparatus, configured to perform the method according to any one of the second aspect or the embodiments of the second aspect.

According to a fifth aspect, this application provides a positioning apparatus. The positioning apparatus includes a memory, a processor, a transceiver, and a computer program that is stored in the memory and that can be run on the processor. When executing the computer program, the processor performs the method according to any one of the first aspect or the embodiments of the first aspect.

In one embodiment, the apparatus may be integrated into a terminal device or a network device, or the apparatus may be independent of the terminal device and the network device. This is not limited in this embodiment of this application.

According to a sixth aspect, this application provides a positioning apparatus. The positioning apparatus includes a memory, a processor, a transceiver, and a computer program that is stored in the memory and that can be run on the processor. When executing the computer program, the processor performs the method according to any one of the second aspect or the embodiments of the second aspect.

In one embodiment, the apparatus may be a terminal device or a network device. This is not limited in this embodiment of this application.

According to a seventh aspect, this application provides a computer-readable medium, configured to store a computer program. The computer program includes an instruction used to perform the method according to any one of the first aspect or the embodiments of the first aspect.

According to an eighth aspect, this application provides a computer-readable medium, configured to store a computer program. The computer program includes an instruction used to perform the method according to any one of the second aspect or the embodiments of the second aspect.

According to a ninth aspect, this application provides a computer program product including an instruction. When the computer program product is run on a computer, the computer is enabled to perform the method according to any one of the first aspect or the embodiments of the first aspect.

According to a tenth aspect, this application provides a computer program product including an instruction. When the computer program product is run on a computer, the computer is enabled to perform the method according to any one of the second aspect or embodiments of the second aspect.

According to an eleventh aspect, this application provides a chip, including: an input interface, an output interface, at least one processor, and a memory. The input interface, the output interface, the processor, and the memory are interconnected by using a bus. The processor is configured to execute code in the memory. When the code is executed, the processor is configured to perform the method according to any one of the first aspect or the embodiments of the first aspect.

In one embodiment, the chip may be integrated into a terminal device or a network device, or the chip may be independent of the terminal device and the network device. This is not limited in this embodiment of this application.

According to a twelfth aspect, this application provides a chip, including: an input interface, an output interface, at least one processor, and a memory. The input interface, the output interface, the processor, and the memory are interconnected by using a bus. The processor is configured to execute code in the memory. When the code is executed, the processor is configured to perform the method according to any one of the second aspect or the embodiments of the second aspect.

In one embodiment, the chip may be integrated into a terminal device or a network device. This is not limited in this embodiment of this application.

DESCRIPTION OF EMBODIMENTS

The following describes the technical solutions of this application with reference to the accompanying drawings.

It should be understood that, the technical solutions of the embodiments of this application may be applied to various communications systems, such as: a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a wireless local area network (WLAN) system, or a fifth generation (5G) wireless communications system.

Figure 1:
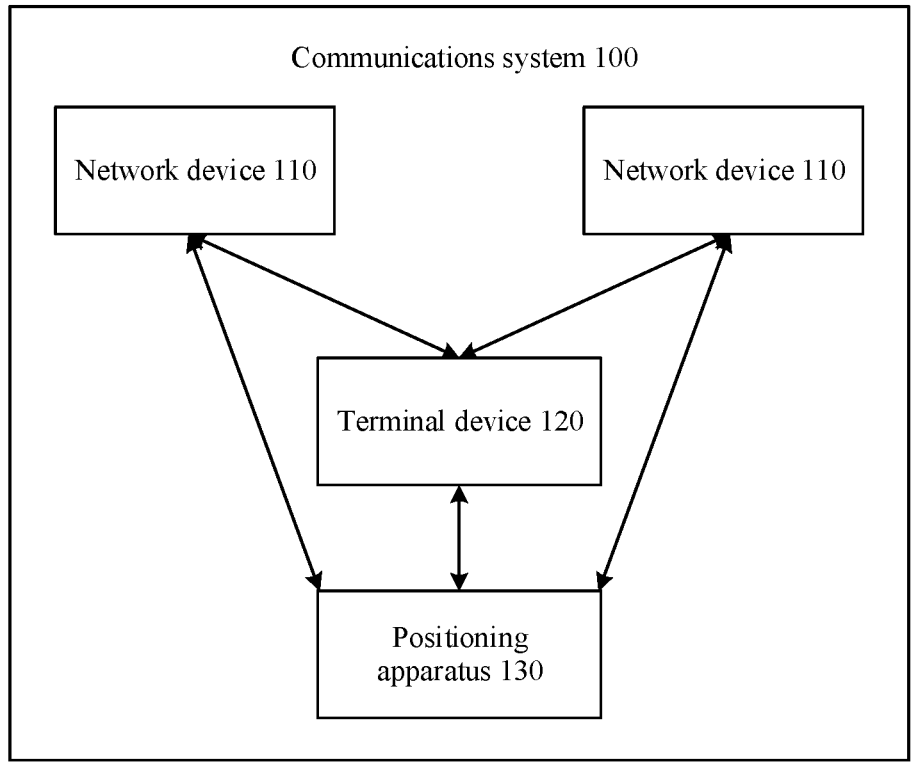
FIG. 1 is a schematic block diagram of a communications system according to an embodiment of this application.

FIG. 1 is a schematic block diagram of a communications system 100 according to an embodiment of this application. As shown in FIG. 1, the communications system 100 may include a plurality of network devices 110, at least one terminal device 120, and a positioning apparatus 130.

In one embodiment, the network device 110 may provide communication coverage for a specific geographical area and may communicate with UE within the coverage area. The network device 110 may be a base transceiver station (BTS) in a GSM system or a CDMA system, or may be a NodeB (NB) in a WCDMA system, or may be an evolved NodeB (eNB or eNodeB) in an LTE system, or a radio controller in a cloud radio access network (CRAN). The network device 110 may alternatively be a core network, a relay node, an access point, a vehicle-mounted device, a wearable device, a network side device in a 5G network, a network device in a future evolved public land mobile network (PLMN), or the like.

In one embodiment, the terminal device 120 may be mobile or fixed. The terminal device 120 may be an access terminal, user equipment (UE), a subscriber unit, a subscriber station, a mobile station, a remote station, a remote terminal, a mobile device, a user terminal, a terminal, a wireless communications device, a user agent, a user apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved PLMN, or the like.

In one embodiment, the positioning apparatus 130 may be a functional module integrated into the network device 110 or the terminal device 120, or the positioning apparatus 130 may be an apparatus, for example, an enhanced serving mobile location center (E-SMLC), independent of the network device 110 and the terminal device 120. This is not limited in this embodiment of this application.

FIG. 1 illustratively shows two network devices 110 and one terminal device 120. In one embodiment, the communications system 100 may alternatively include another quantity of network devices 110, another quantity of terminal devices 120 may be included within a coverage area of each network device 110, and each terminal device 120 may communicate with at least one network device 110 over a plurality of channels. This is not limited in this embodiment of this application. In one embodiment, the communications system 100 may further include another network entity such as a network controller or a mobility management entity. This embodiment of this application is not limited thereto.

In one embodiment, any two of the plurality of channels may correspond to a same network device or different network devices. In other words, the plurality of channels may include channels established between the terminal device 120 and different cells of the same network device, or the plurality of channels may include channels established between the different network devices and the terminal device 120. This is not limited in this embodiment of this application.

In one embodiment, it may be understood that, in this embodiment of this application, for a network device corresponding to a channel, the terminal device communicates with the network device over the channel. This is not limited in this embodiment of this application.

In the prior art, the network device 110 and the terminal device 120 communicate with each other over a channel established by using an air interface, and the positioning apparatus 130 communicates with the network device 110 or the terminal device 120 over a network.

In one embodiment, because a location of the network device 110 deployed in the communications system 100 is known, the positioning apparatus 130 may obtain positioning measurement information of a channel from the network device 110 or the terminal device 120, and locates the terminal device 120 based on the positioning measurement information, where the channel is used for communication between the network device 110 and the terminal device 120.

In this embodiment of this application, the positioning measurement information of the channel may include a time of arrival (TOA) and/or a direction of arrival (DOA) of an uplink signal received by the network device 110 from the terminal device 120 over the channel; or the positioning measurement information of the channel may include a TOA and/or a DOA of a downlink signal received by the terminal device 120 from the network device 110 over the channel. This is not limited in this embodiment of this application.

In one embodiment, the positioning measurement information in this embodiment of this application may further include other information used to locate the terminal device 120. This is not limited in this embodiment of this application.

However, according to the positioning method in the prior art, on different channels for the terminal device 120, a transmission environment for a signal is unknown, that is, the transmission environment for the signal on some channels is good, and the transmission environment for the signal on some channels is poor. Therefore, accuracy varies when the positioning apparatus 130 locates the terminal device 120 by using different channels.

According to a positioning method provided in an embodiment of this application, a positioning apparatus obtains information about a transmission environment of each channel in a plurality of channels for a terminal device, selects a target channel from the plurality of channels based on the information about the transmission environment of each channel, and locates the terminal device based on positioning measurement information of the target channel. This helps improve positioning accuracy.

Figure 2:
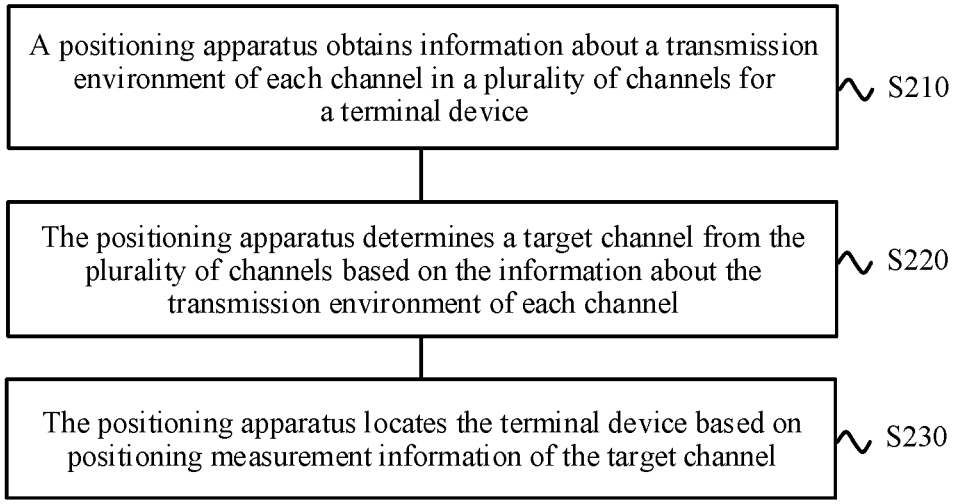
FIG. 2 is a schematic flowchart of a positioning method according to an embodiment of this application.

FIG. 2 is a schematic flowchart of a positioning method 200 according to an embodiment of this application. The method 200 may be applied to the communications system 100 shown in FIG. 1 and performed by the positioning apparatus in the communications system 100. This is not limited in this embodiment of this application.

S210. The positioning apparatus obtains information about a transmission environment of each channel in a plurality of channels for a terminal device.

In one embodiment, any two of the plurality of channels may correspond to a same network device or different network devices. In other words, the plurality of channels may include channels established between the terminal device and different cells of the same network device, or the plurality of channels may include channels established between the different network devices and the terminal device. This is not limited in this embodiment of this application.

In one embodiment, it may be understood that, in this embodiment of this application, for a network device corresponding to a channel, the terminal device communicates with the network device over the channel. This is not limited in this embodiment of this application.

In one embodiment, the positioning apparatus may be a functional module integrated into the terminal device or the network device, or the positioning apparatus may be an apparatus independent of the terminal device and the network device. This is not limited in this embodiment of this application.

In one embodiment, when the positioning apparatus may be an apparatus independent of the terminal device and the network device, the positioning apparatus may receive the information about the transmission environment of each channel in the plurality of channels from the terminal device or a network device corresponding to each channel in the plurality of channels.

In one embodiment, when the positioning apparatus may be a functional module integrated into the terminal device or the network device, the positioning apparatus may obtain the information about the transmission environment of each channel from the terminal device or a network device corresponding to each channel in the plurality of channels.

In this embodiment of this application, information about a transmission environment of a channel may include one bit or two bits, used to indicate the transmission environment of the channel. This is not limited in this embodiment of this application.

In one embodiment, when the information about the transmission environment includes one bit, the one bit may be used to indicate whether the transmission environment is line-of-sight (LOS) transmission or non-line-of-sight (NLOS) transmission.

It should be understood that, that a transmission environment is LOS in this embodiment of this application means that a radio signal can be transmitted between a transmit end and a receive end in a "straight line" without an obstruction. In other words, there is a direct path between the transmit end and the receive end.

It should further be understood that, that a transmission environment is NLOS in this embodiment of this application means that due to an obstruction, some radio signals directly arrive at a receive end, and some radio signals need to pass along a path of reflection, scattering, diffraction, or the like to arrive at the receive end. In other words, there is the obstruction in a path between a transmit end and the receive end.

In one embodiment, in an uplink transmission scenario, the transmit end is a terminal device, and the receive end is a network device; in a downlink transmission scenario, the transmit end is a network device, and the receive end is a terminal device. This is not limited in this embodiment of this application.

For example, when the one bit included in the information about the transmission environment of the channel is 1, the transmission environment of the channel is LOS; when the one bit included in the information about the transmission environment of the channel is 0, the transmission environment of the channel is NLOS.

It should be understood that, that the information about the transmission environment is 1 may be understood as that a probability that the transmission environment of the channel is LOS is greater than a first preset value; and that the information about the transmission environment is 0 may be understood as that the probability that the transmission environment of the channel is LOS is less than or equal to the first preset value.

In other words, a transmission environment of a LOS channel is better than that of an NLOS channel.

It should further be understood that, in this embodiment of this application, the foregoing indication manner is merely used as an example for description. In this embodiment of this application, the information about the transmission environment may alternatively indicate, in another manner, the transmission environment of the channel by using one bit. This is not limited in this embodiment of this application.

In one embodiment, when the information about the transmission environment includes two bits, the two bits may be used to indicate whether the transmission environment is LOS, near LOS, near NLOS, or NLOS.

For example, when the two bits included in the information about the transmission environment of the channel are 00, the transmission environment of the channel is NLOS; when the two bits included in the information about the transmission environment of the channel are 01, the transmission environment of the channel is near NLOS; when the two bits included in the information about the transmission environment of the channel are 10, the transmission environment of the channel is near LOS; when the two bits included in the information about the transmission environment of the channel are 11, the transmission environment of the channel is LOS.

It should be understood that, that the information about the transmission environment is 00 may be understood as that a probability that the transmission environment of the channel is LOS is less than or equal to a first preset value; that the information about the transmission environment is 01 may be understood as that the probability that the transmission environment of the channel is LOS is greater than the first preset value and is less than or equal to a second preset value; that the information about the transmission environment is 10 may be understood as that the probability that the transmission environment of the channel is LOS is greater than the second preset value and is less than or equal to a third preset value; and that the information about the transmission environment is 11 may be understood as that the probability that the transmission environment of the channel is LOS is greater than the third preset value. The first preset value is less than the second preset value, and the second preset value is less than the third preset value.

In other words, a transmission environment of a LOS channel is better than that of a near LOS channel, a transmission environment of the near LOS channel is better than that of a near NLOS channel, and a transmission environment of the near NLOS channel is better than that of an NLOS channel.

It should further be understood that, in this embodiment of this application, the foregoing indication manner is merely used as an example for description. In this embodiment of this application, the information about the transmission environment may alternatively indicate, in another manner, the transmission environment of the channel by using two bits. This is not limited in this embodiment of this application.

S220. The positioning apparatus determines a target channel from the plurality of channels based on the information about the transmission environment of each channel.

In one embodiment, the positioning apparatus may determine a channel in the plurality of channels that has a comparatively good transmission environment as the target channel based on the information about the transmission environment of each channel.

In one embodiment, when a plurality of transmission environments of the plurality of channels include LOS and NLOS, the positioning apparatus may determine a channel in the plurality of channels whose transmission environment is LOS as the target channel.

In one embodiment, when a plurality of transmission environments of the plurality of channels include LOS and at least one of near LOS, near NLOS, and NLOS, the positioning apparatus may determine a channel in the plurality of channels whose transmission environment is LOS as the target channel.

In one embodiment, when a plurality of transmission environments of the plurality of channels include near LOS and at least one of near NLOS and NLOS, the positioning apparatus may determine a channel in the plurality of channels whose transmission environment is near LOS as the target channel.

It should be understood that, if there is no channel whose transmission environment is LOS or near LOS among the plurality of channels, the positioning apparatus may use a channel whose transmission environment is near NLOS as the target channel; if there is even no channel whose transmission environment is near NLOS, the positioning apparatus has no choice but to select a channel whose transmission environment is NLOS. In this case, a positioning result may have an error. However, if the positioning apparatus can learn a transmission environment of the target channel, the positioning apparatus learns a rough accuracy range of the positioning result when locating the terminal device.

S230. The positioning apparatus locates the terminal device based on positioning measurement information of the target channel.

In one embodiment, the positioning measurement information may include at least one of a TOA and a DOA, or may further include other information used to locate the terminal device. This is not limited in this embodiment of this application.

According to the positioning method 200 provided in this embodiment of this application, the positioning apparatus selects, from the plurality of channels based on the obtained information about the transmission environment of each channel in the plurality of channels, a channel having a comparatively good transmission environment as the target channel, and locates the terminal device based on the positioning measurement information of the target channel. This helps improve positioning accuracy.

In one embodiment, the positioning apparatus may obtain the information about the transmission environment of each channel in the plurality of channels in a plurality of manners. This is not limited in this embodiment of this application.

In one embodiment, the positioning apparatus may send one first request message to the terminal device or all network devices corresponding to the plurality of channels, where the first request message is used to request information about the transmission environments of the plurality of channels; or the positioning apparatus may separately send one first request message to the terminal device or each network device corresponding to the plurality of channels, where the first request message is used to request the information about the transmission environment of each channel. This is not limited in this embodiment of this application.

In one embodiment, before S230, the method 200 further includes: obtaining, by the positioning apparatus, positioning measurement information of at least one channel in the plurality of channels, where the at least one channel includes the target channel.

In one embodiment, the positioning apparatus may obtain positioning measurement information of each channel in the plurality of channels, or obtain only the positioning measurement information of the target channel. There may be one or more target channels. This is not limited in this embodiment of this application.

In one embodiment, the positioning apparatus may send one second request message to the terminal device or all network devices corresponding to the at least one channel, or the positioning apparatus may separately send one second request message to the terminal device or each network device corresponding to the at least one channel. This is not limited in this embodiment of this application.

In one embodiment, for a same channel, the first request message used to request information about a transmission environment of the channel and the second request message used to request positioning measurement information of the channel may be a same request message or different request messages. This is not limited in this embodiment of this application. When the first request message and the second request message are different, a sequence of sending the two request messages is not limited in this embodiment of this application. Similarly, a sequence of receiving two feedback messages is not limited either in this embodiment of this application.

In one embodiment, the positioning apparatus may first request the information about the transmission environment of each channel in the plurality of channels from the network device corresponding to each channel in the plurality of channels or the terminal device, select the target channel from the plurality of channels based on the information about the transmission environment of each channel in the plurality of channels, then request the positioning measurement information of the target channel from the network device corresponding to the target channel or the terminal device, and locate the terminal device based on the positioning measurement information of the target channel.

In one embodiment, the positioning apparatus may simultaneously request the information about the transmission environment and the positioning measurement information of each channel in the plurality of channels from the network device corresponding to each channel in the plurality of channels or the terminal device, select the target channel from the plurality of channels based on the information about the transmission environment of each channel in the plurality of channels, and locate the terminal device based on the positioning measurement information of the target channel.

According to the positioning method 200 provided in this embodiment of this application, the positioning apparatus requests the positioning measurement information and the information about the transmission environment of each channel in the plurality of channels by using one request message, or obtains the positioning measurement information and the information about the transmission environment of each channel by using one feedback message, so that signaling overheads can be reduced.

In addition, according to the positioning method 200 provided in this embodiment of this application, the positioning apparatus first requests the information about the transmission environment of each channel in the plurality of channels by using one request message, and selects the target channel from the plurality of channels based on the obtained information about the transmission environment of each channel in the plurality of channels, then requests the positioning measurement information of the target channel by using another request message, and locates the terminal device based on the obtained positioning measurement information of the target channel, so that signaling overheads can also be reduced.

In one embodiment, the positioning apparatus may send, to the terminal device or the network device corresponding to each channel depending on whether the terminal device or the network device corresponding to each channel in the plurality of channels has a capability of locating the terminal device, indication information used to instruct to or not to report the transmission environment of each channel, and the terminal device or the network device corresponding to each channel determines, based on the indication information, whether to report the information about the transmission environment of each channel.

In one embodiment, when the terminal device or the network device corresponding to each channel in the plurality of channels has the capability of locating the terminal device, the positioning apparatus may send a request message to the terminal device or the network device corresponding to each channel, where the request message is used to request reporting of a location of the terminal device, and the request message carries indication information used to instruct not to report the information about the transmission environment of each channel; correspondingly, the terminal device or the network device corresponding to each channel receives the request message from the positioning apparatus, locates the terminal device based on the request message, and sends a feedback message to the positioning apparatus, where the feedback message carries information about the location of the terminal device.

In one embodiment, when the terminal device or the network device corresponding to each channel in the plurality of channels does not have the capability of locating the terminal device, the positioning apparatus may send a request message to the terminal device or the network device corresponding to each channel, where the request message is used to request reporting of a location of the terminal device, and the request message carries indication information used to instruct to report the information about the transmission environment of each channel; correspondingly, the terminal device or the network device corresponding to each channel receives the request message from the positioning apparatus, and sends a feedback message to the positioning apparatus based on the request message, where the feedback message carries the positioning measurement information and the information about the transmission environment of each channel.

In one embodiment, the positioning apparatus may instruct, by using one bit in the request message, the terminal device or the network device corresponding to each channel to or not to report the information about the transmission environment of each channel.

For example, when the one bit is 1, it indicates that the information about the transmission environment is to be reported; when the one bit is 0, it indicates that the information about the transmission environment is not to be reported.

In this embodiment of this application, a message may be transmitted between the positioning apparatus and the terminal device, for example, by using the LTE positioning protocol (LPP), and a message may be transmitted between the positioning apparatus and the network device, for example, by using the LTE positioning protocol annex (LPPa). This is not limited in this embodiment of this application.

Figure 3:
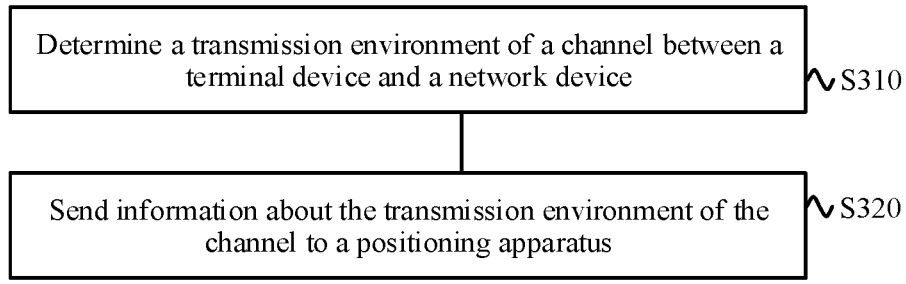
FIG. 3 is a schematic flowchart of another positioning method according to an embodiment of this application.

FIG. 3 is a schematic flowchart of a positioning method 300 according to an embodiment of this application. The method 300 may be applied to the communications system 100 shown in FIG. 1 and performed by a network device or a terminal device that performs communication over a same channel in the communications system 100. This is not limited in this embodiment of this application.

S310. Determine a transmission environment of a channel between a terminal device and a network device.

In one embodiment, the determining a transmission environment of a channel may be determining a difference between a direction of arrival DOA of a high frequency signal and a DOA of a low frequency signal on the channel; and determining information about the transmission environment of the channel based on the difference.

In one embodiment, if the difference is less than or equal to a first preset value, the transmission environment of the channel is LOS; or if the difference is greater than the first preset value, the transmission environment of the channel is NLOS.

In one embodiment, if the difference is less than or equal to a first preset value, the transmission environment of the channel is LOS; if the difference is greater than the first preset value and is less than or equal to a second preset value, the transmission environment of the channel is near LOS, where the second preset value is greater than the first preset value; if the difference is greater than the second preset value and is less than or equal to a third preset value, the transmission environment of the channel is near NLOS, where the third preset value is greater than the second preset value; or if the difference is greater than the third preset value, the transmission environment of the channel is NLOS.

S320. Send the information about the transmission environment of the channel to a positioning apparatus.

In one embodiment, the method 300 further includes: sending positioning measurement information of the channel to the positioning apparatus, where the positioning measurement information is used to locate the terminal device.

In one embodiment, the positioning measurement information may include a DOA and/or a time of arrival TOA, or other information used to locate the terminal device. This is not limited in this embodiment of this application.

In one embodiment, a method for reporting the positioning measurement information and the information about the transmission environment of the channel corresponds to the method for receiving positioning measurement information and information about a transmission environment of a channel by the positioning apparatus in FIG. 2. To avoid repetition, details are not described herein again.

In one embodiment, the information about the transmission environment may include one bit or two bits, used to indicate the transmission environment of the channel. A specific indication manner is similar to the indication manner in FIG. 2. To avoid repetition, details are not described herein again.

According to the positioning method 300 provided in this embodiment of this application, the transmission environment of the channel between the terminal device and the network device is determined, and the information used to indicate the transmission environment is reported to the positioning apparatus, so that the positioning apparatus locates the terminal device based on the information about the transmission environment of the channel. This helps improve positioning accuracy.

Figure 4:
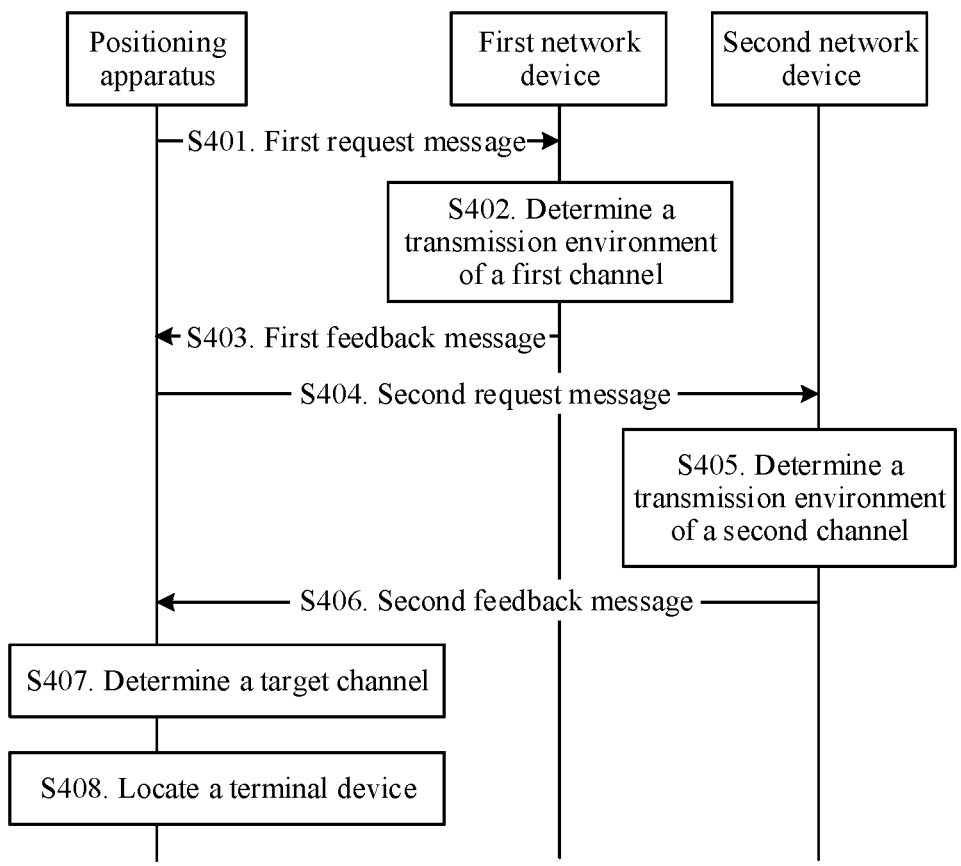
FIG. 4 is a schematic flowchart of still another positioning method according to an embodiment of this application.

FIG. 4 is a schematic flowchart of a positioning method 400 according to an embodiment of this application. The method 400 may be applied to the communications system 100 shown in FIG. 1. For example, a terminal device communicates with a first network device over a first channel and communicates with a second network device over a second channel, and none of the terminal device, the first network device, and the second network device has a capability of locating the terminal device.

In one embodiment, a message may be transmitted between a positioning apparatus and the terminal device, for example, by using the LPP protocol, and a message may be transmitted between the positioning apparatus and the network device (first network device or second network device), for example, by using the LPPa protocol. This is not limited in this embodiment of this application.

S401. The positioning apparatus sends a first request message to the first network device, where the first request message is used to request a location of the terminal device, the first request message carries first indication information, and the first indication information is used to instruct to report information about a transmission environment of the first channel. Correspondingly, the first network device receives the first request message from the positioning apparatus.

S402. The first network device determines the transmission environment of the first channel based on the first request message.

S403. The first network device sends a first feedback message to the positioning apparatus, where the first feedback message carries the information about the transmission environment of the first channel and positioning measurement information of the first channel. Correspondingly, the positioning apparatus receives the first feedback message from the first network device.

S404. The positioning apparatus sends a second request message to the second network device, where the second request message is used to request the location of the terminal device, the second request message carries second indication information, and the second indication information is used to instruct to report information about a transmission environment of the second channel. Correspondingly, the second network device receives the second request message from the positioning apparatus.

S405. The second network device determines the transmission environment of the second channel based on the second request message.

S406. The second network device sends a second feedback message to the positioning apparatus, where the second feedback message carries the information about the transmission environment of the second channel and positioning measurement information of the second channel. Correspondingly, the positioning apparatus receives the second feedback message from the second network device.

In one embodiment, S401 to S403 are a method for reporting the positioning measurement information of the first channel and the information about the transmission environment of the first channel by the first network device, and S404 to S406 are a method for reporting the positioning measurement information of the second channel and the information about the transmission environment of the second channel by the second network device. Therefore, a sequence of performing S401 to S403 and S404 to S406 is not limited.

S407. The positioning apparatus determines a target channel based on the transmission environment of the first channel and the transmission environment of the second channel.

In one embodiment, a method for determining the target channel by the positioning apparatus is similar to the method described in FIG. 2. To avoid repetition, details are not described herein again.

S408. The positioning apparatus locates the terminal device based on positioning measurement information of the target channel.

The foregoing describes in detail the positioning method provided in the embodiments of this application with reference to FIG. 1 to FIG. 4. The following describes the positioning apparatus provided in the embodiments of this application with reference to FIG. 5 to FIG. 8.

Figure 5:
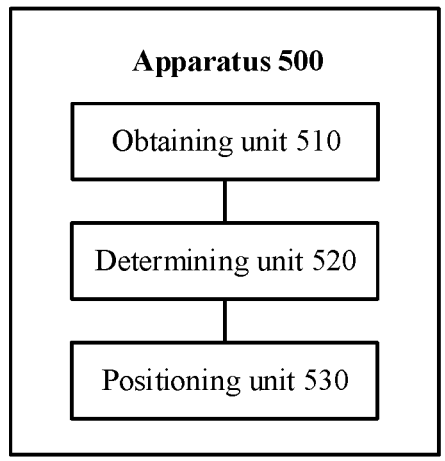
FIG. 5 is a schematic block diagram of a positioning apparatus according to an embodiment of this application.

FIG. 5 shows a positioning apparatus 500 according to an embodiment of this application. The apparatus 500 includes:

an obtaining unit 510, configured to obtain information about a transmission environment of each channel in a plurality of channels for a terminal apparatus;

a determining unit 520, configured to determine a target channel from the plurality of channels based on the information that is about the transmission environment of each channel and that is obtained by the obtaining unit 510; and a positioning unit 530, configured to locate the terminal apparatus based on positioning measurement information of the target channel determined by the determining unit 520.

In one embodiment, transmission environments of the plurality of channels include line-of-sight (LOS) transmission and non-line-of-sight (NLOS) transmission, and the determining unit 520 is configured to determine a channel in the plurality of channels whose transmission environment is LOS as the target channel.

In one embodiment, transmission environments of the plurality of channels include near LOS and at least one of near NLOS and NLOS, and the determining unit 520 is configured to determine a channel in the plurality of channels whose transmission environment is near LOS as the target channel.

In one embodiment, the apparatus 500 further includes a first sending unit. The first sending unit is configured to: before the obtaining information about a transmission environment of each channel in a plurality of channels for a terminal device, send a first request message to the terminal device or a network device corresponding to each channel in the plurality of channels, where the first request message is used to request the information about the transmission environment of each channel; and the obtaining unit 510 is configured to receive a first feedback message from the terminal device or the network device corresponding to each channel in the plurality of channels, where the first feedback message is determined based on the first request message, and the first feedback message carries the information about the transmission environment of each channel.

In one embodiment, the obtaining unit 510 is further configured to: before the locating the terminal device based on positioning measurement information of the target channel, obtain positioning measurement information of at least one channel in the plurality of channels, where the at least one channel includes the target channel.

In one embodiment, the apparatus 120 further includes a second sending unit. The second sending unit is configured to: before the obtaining positioning measurement information of at least one channel, send a second request message to the terminal device or a network device corresponding to each of the at least one channel, where the second request message is used to request a location of the terminal device; the obtaining unit 510 is configured to receive a second feedback message from the terminal device or the network device corresponding to each of the at least one channel, where the second feedback message is determined based on the second request message, and the second feedback message carries positioning measurement information of each of the at least one channel.

It should be understood that the apparatus 500 herein is embodied in a form of a functional unit. The term "unit" herein may be an application-specific integrated circuit (ASIC), an electronic circuit, a processor (for example, a shared processor, a dedicated processor, or a group processor) and a memory for executing one or more software or firmware programs, a combinational logic circuit, and/or another appropriate component that supports the described function. In one embodiment, a person skilled in the art may understand that the apparatus 500 may be the positioning apparatus in the embodiments of the method 200 and method 300, and the apparatus 500 may be configured to perform procedures and/or operations corresponding to the positioning apparatus in the embodiments of the method 200 and method 300. To avoid repetition, details are not described herein.

In one embodiment, the apparatus 500 may be integrated into the network device or the terminal device in the embodiments of the method 200 and method 300, or the apparatus 500 may be independent of the network device and the terminal device in the embodiments of the method 200 and method 300. This is not limited in this embodiment of this application.

Figure 6:
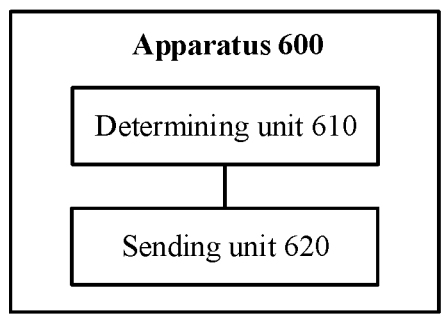
FIG. 6 is a schematic block diagram of another positioning apparatus according to an embodiment of this application.

FIG. 6 shows a positioning apparatus 600 according to an embodiment of this application. The apparatus 600 includes:

a determining unit 610, configured to determine a transmission environment of a channel between a terminal apparatus and a network apparatus; and a sending unit 620, configured to send information about the transmission environment that is of the channel and that is determined by the determining unit 610 to a positioning apparatus.

In one embodiment, the determining unit 610 is configured to: obtain a difference between a direction of arrival DOA of a high frequency signal and a DOA of a low frequency signal on the channel; and determine the transmission environment of the channel based on the difference.

In one embodiment, the determining unit 610 is configured to: if the difference is less than or equal to a first preset value, determine that the transmission environment of the channel is LOS; or if the difference is greater than the first preset value, determine that the transmission environment of the channel is NLOS.

In one embodiment, the determining unit 610 is configured to: if the difference is less than or equal to a first preset value, determine that the transmission environment of the channel is LOS; if the difference is greater than the first preset value and is less than or equal to a second preset value, determine that the transmission environment of the channel is near LOS, where the second preset value is greater than the first preset value; if the difference is greater than the second preset value and is less than or equal to a third preset value, determine that the transmission environment of the channel is near NLOS, where the third preset value is greater than the second preset value; or if the difference is greater than the third preset value, determine that the transmission environment of the channel is NLOS.

In one embodiment, the apparatus 600 further includes a first receiving unit. The first receiving unit is configured to: before the sending information about the transmission environment of the channel to a positioning apparatus, receive a first request message sent by the positioning apparatus, where the first request message is used to request the information about the transmission environment of the channel; and the sending unit 620 is configured to send a first feedback message to the positioning apparatus based on the first request message, where the first feedback message carries the information about the transmission environment of the channel.

In one embodiment, the determining unit 610 is further configured to determine positioning measurement information of the channel, where the positioning measurement information is used to locate the terminal device; and the sending unit 620 is further configured to send the positioning measurement information to the positioning apparatus.

In one embodiment, the apparatus 600 further includes a second receiving unit. The second receiving unit is configured to: before the sending the positioning measurement information of the channel to the positioning apparatus, receive a second request message sent by the positioning apparatus, where the second request message is used to request a location of the terminal device; and the sending unit 620 is configured to send a second feedback message to the positioning apparatus based on the second request message, where the second feedback message carries the positioning measurement information of the channel.

In one embodiment, the positioning measurement information includes a DOA and/or a time of arrival TOA.

It should be understood that the apparatus 600 herein is embodied in a form of a functional unit. Herein the term "unit" may be an ASIC, an electronic circuit, a processor (for example, a shared processor, a dedicated processor, or a group processor) and a memory for executing one or more software or firmware programs, a combinational logic circuit, and/or another appropriate component that supports the described function. In one embodiment, a person skilled in the art may understand that the apparatus 600 may be the terminal device or the network device in the embodiments of the method 200 and method 300, and the apparatus 600 may be configured to perform procedures and/or operations corresponding to the terminal device or the network device in the embodiments of the method 200 and method 300. To avoid repetition, details are not described herein again.

Figure 7:
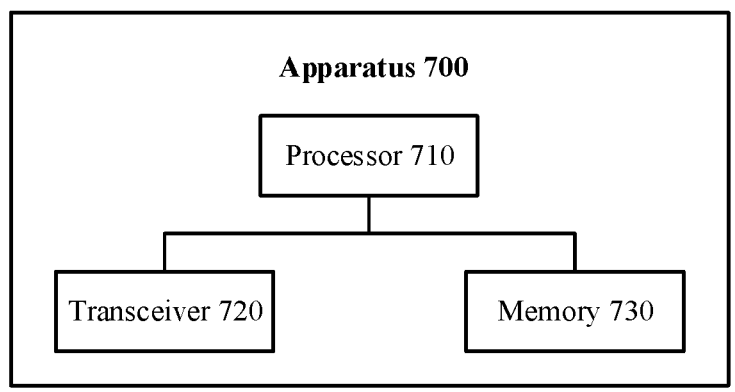
FIG. 7 is a schematic block diagram of still another positioning apparatus according to an embodiment of this application.

FIG. 7 shows a positioning apparatus 700 according to an embodiment of this application. The apparatus 700 may be the positioning apparatus 130 in the communications system 100 shown in FIG. 1. The positioning apparatus 130 may use a hardware architecture shown in FIG. 7. The positioning apparatus 130 may include a processor 710, a transceiver 720, and a memory 730. The processor 710, the transceiver 720, and the memory 730 communicate with each other over an internal connection path. Related functions implemented by the determining unit 520 and the positioning unit 530 in FIG. 5 may be implemented by the processor 710, and related functions implemented by the obtaining unit 510 may be implemented by the transceiver 720.

The processor 710 may include one or more processors, for example, include one or more central processing units (CPU). When the processor 710 is one CPU, the CPU may be a single-core CPU or a multi-core CPU.

The transceiver 720 is configured to send data and/or a signal, and receive data and/or a signal. The transceiver 720 may include a transmitter and a receiver. The transmitter is configured to send data and/or a signal, and the receiver is configured to receive data and/or a signal.

The memory 730 includes but is not limited to a random access memory (RAM), a read-only memory (ROM), an erasable programmable read-only memory (EPROM), and a compact disc read-only memory (CD-ROM). The memory 730 is configured to store a related instruction and data.

The memory 730 is configured to store program code and data of a network device, and may be a separate device or integrated into the processor 710.

In one embodiment, the processor 710 is configured to control the transceiver 720 to obtain information about a transmission environment of each channel in a plurality of channels, determine a target channel from the plurality of channels based on the information about the transmission environment of each channel, and locate the terminal device based on positioning measurement information of the target channel. For example, S210 to S230 are performed. For details, refer to the description in the method embodiments, and details are not described herein again.

In one embodiment, the apparatus 700 may be integrated into the network device or the terminal device, or may be independent of the terminal device or the network device. This is not limited in this embodiment of this application.

It can be understood that FIG. 7 shows only a simplified embodiment of the positioning apparatus 130. In actual application, the positioning apparatus 130 may further include another component, including but not limited to any quantity of transceivers, processors, controllers, memories, or the like, and all positioning apparatuses that can implement this application shall fall within the protection scope of this application.

In one embodiment, the apparatus 700 may be a chip, and the chip, for example, may be a communications chip that can be applied to the positioning apparatus, and is configured to implement a related function of the processor 710 in the positioning apparatus. The chip may be a field programmable gate array, a dedicated integrated chip, a system chip, a central processing unit, a network processor, a digital signal processing circuit, or a microcontroller for implementing a related function, or may be a programmable controller or another integrated chip. In one embodiment, the chip may include one or more memories, configured to store program code. When the code is executed, the chip is enabled to implement a corresponding function.

In one embodiment, the chip may be integrated into the network device or the terminal device, or may be independent of the network device and the terminal device. This is not limited in this embodiment of this application.

Figure 8:
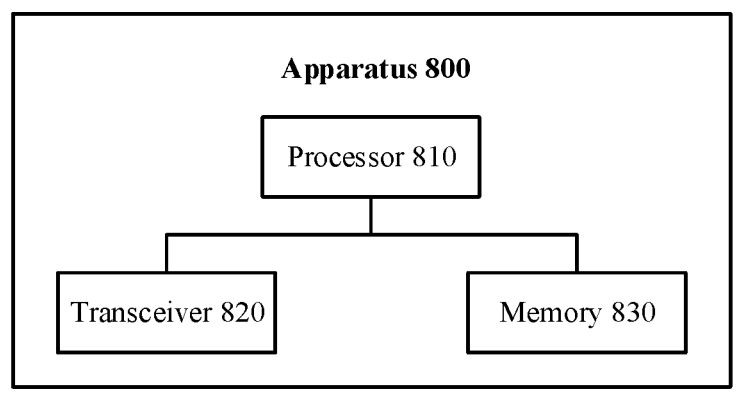
FIG. 8 is a schematic block diagram of yet another positioning apparatus according to an embodiment of this application.

FIG. 8 shows a positioning apparatus 800 according to an embodiment of this application. The apparatus 800 may be the terminal device 120 or the network device 110 in the communications system 100 shown in FIG. 1. The terminal device 120 or the network device 110 may use a hardware architecture shown in FIG. 8. The terminal device 120 or the network device 110 may include a processor 810, a transceiver 820, and a memory 830. The processor 810, the transceiver 820, and the memory 830 communicate with each other over an internal connection path. A related function implemented by the determining unit 610 in FIG. 6 may be implemented by the processor 810, and a related function implemented by the sending unit 620 may be implemented by the transmitter 820.

The processor 810 may include one or more processors, for example, include one or more central processing units CPUs. When the processor is one CPU, the CPU may be a single-core CPU or a multi-core CPU.

The transceiver 820 is configured to send data and/or a signal, and receive data and/or a signal. The transceiver 820 may include a transmitter and a receiver. The transmitter is configured to send data and/or a signal, and the receiver is configured to receive data and/or a signal.

The memory 830 includes but is not limited to a RAM, a ROM, an EPROM, and a CD-ROM. The memory 830 is configured to store a related instruction and data.

The memory 830 is configured to store program code and data of the terminal device, and may be a separate device or integrated into the processor 810.

In one embodiment, the processor 810 is configured to determine a transmission environment of a channel between the terminal device 120 and the network device 110, and control the transceiver 820 to send information about the transmission environment of the channel to a positioning apparatus. For example, S310 to S320 are performed. For details, refer to the description in the method embodiments, and details are not described herein again.

It may be understood that FIG. 8 shows only a simplified embodiment of the network device 110 or the terminal device 120. In actual application, the terminal device 120 or the network device 110 may further include another component, including but not limited to any quantity of transceivers, processors, controllers, memories, or the like, and all network devices or terminal devices that can implement this application shall fall within the protection scope of this application.

In one embodiment, the apparatus 800 may be a chip, for example, may be a communications chip that can be applied to the network device 110 or the terminal device 120, and is configured to implement a related function of the processor 810 in the network device 110 or the terminal device 120. The chip may be a field programmable gate array, a dedicated integrated chip, a system chip, a central processing unit, a network processor, a digital signal processing circuit, or a microcontroller for implementing a related function, or may be a programmable controller or another integrated chip. In one embodiment, the chip may include one or more memories, configured to store program code. When the code is executed, the chip is enabled to implement a corresponding function.

All or some of the foregoing embodiments may be implemented by using software, hardware, firmware, or any combination thereof. When implemented by using software, all or some of the embodiments may be implemented in a form of a computer program product. The computer program product includes one or more computer instructions. When the computer program instructions are loaded and executed on the computer, all or some of the procedures or functions according to the embodiments of the application are generated. The computer may be a general-purpose computer, a dedicated computer, a computer network, or another programmable apparatus. The computer instruction may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A positioning method comprising: obtaining, by a positioning apparatus, information about a transmission environment of each channel in a plurality of channels for a terminal device, wherein obtaining, by the positioning apparatus, information about the transmission environment of each channel in the plurality of channels for the terminal device includes: sending, by the positioning apparatus, a first request message to the terminal device or a network device corresponding to each channel in the plurality of channels, wherein the first request message is used to request the information about the transmission environment of each channel, and receiving, by the positioning apparatus, a first feedback message from the terminal device or the network device corresponding to each channel in the plurality of channels, wherein the first feedback message carries the information about the transmission environment of each channel, wherein the transmission environments of the plurality of channels comprise line-of-sight (LOS) transmission, non-line-of-sight (NLOS) transmission, near LOS, and near NLOS, wherein determining the transmission environment includes: obtaining a difference between a direction of arrival (DOA) of a high frequency signal and a DOA of a low frequency signal on the channel; and determining the transmission environment of the channel based on the difference includes upon determining the difference is less than or equal to a first preset value, determine the transmission environment of the channel is line of sight (LOS), upon determining the difference is greater than the first preset value and is less than or equal to a second preset value, determine the transmission environment of the channel is near LOS, wherein the second preset value is greater than the first preset value;

determining, by the positioning apparatus, a target channel from the plurality of channels based on the information about the transmission environment of each channel; and locating, by the positioning apparatus, the terminal device based on positioning measurement information of the target channel.

2. The method according to claim 1, wherein the determining, by the positioning apparatus, a target channel from the plurality of channels based on the information about the transmission environment of each channel comprises: determining, by the positioning apparatus, a channel in the plurality of channels whose transmission environment is LOS as the target channel.

3. The method according to claim 1, wherein the determining, by the positioning apparatus, a target channel from the plurality of channels based on the information about the transmission environment of each channel comprises: determining, by the positioning apparatus, a channel in the plurality of channels whose transmission environment is near LOS as the target channel.

4. The method according to claim 1, wherein before the locating, by the positioning apparatus, the terminal device based on positioning measurement information of the target channel, the method further comprises:
obtaining, by the positioning apparatus, positioning measurement information of at least one channel in the plurality of channels, wherein the at least one channel comprises the target channel.

5. The method according to claim 4, wherein before the obtaining, by the positioning apparatus, positioning measurement information of at least one channel, the method further comprises:
sending, by the positioning apparatus, a second request message to the terminal device or a network device corresponding to each of the at least one channel, wherein the second request message is used to request a location of the terminal device; and
the obtaining, by the positioning apparatus, positioning measurement information of at least one channel in the plurality of channels comprises:
receiving, by the positioning apparatus, a second feedback message from the terminal device or the network device corresponding to each of the at least one channel, wherein the second feedback message carries positioning measurement information of each of the at least one channel.

6. The method according to claim 1, wherein determining the transmission environment includes: upon determining the difference is greater than the second preset value and is less than or equal to a third preset value, determining the transmission environment of the channel is near NLOS, wherein the third preset value is greater than the second preset value; or upon determining the difference is greater than the third preset value, determining the transmission environment of the channel is NLOS.

7. A positioning apparatus comprising:
a processor configured to determine a transmission environment of a channel between a terminal device and a network device; and
a transceiver configured to send information about the transmission environment that is of the channel and that is determined by the processor of the positioning apparatus, wherein the positioning apparatus obtains information about the transmission environment of each channel in a plurality of channels for the terminal device by: sending, by the transceiver of the positioning apparatus, a first request message to the terminal device or the network device corresponding to each channel in the plurality of channels, wherein the first request message is used to request the information about the transmission environment of each channel, and receiving, by transceiver of the positioning apparatus, a first feedback message from the terminal device or the network device corresponding to each channel in the plurality of channels, wherein the first feedback message carries the information about the transmission environment of each channel, and wherein, the processor determines a target channel from the plurality of channels based on the information about the transmission environment of each channel and a location of the terminal device based on positioning measurement information of the target channel;
wherein transmission environments of the plurality of channels comprise line-of-sight (LOS) transmission, non-line-of-sight (NLOS) transmission, near LOS, and near NLOS, and wherein the processor is further configured to: obtain a difference between a direction of arrival (DOA) of a high frequency signal and a DOA of a low frequency signal on the channel; and determine the transmission environment of the channel based on the difference, and, when the difference is less than or equal to a first preset value, determine the transmission environment of the channel is LOS, when the difference is greater than the first preset value and is less than or equal to a second preset value, determine the transmission environment of the channel is near LOS, wherein the second preset value is greater than the first preset value.

8. The apparatus according to claim 7, wherein the processor is configured to:
when the difference is greater than the second preset value and is less than or equal to a third preset value, determine the transmission environment of the channel is near NLOS, wherein the third preset value is greater than the second preset value; or
when the difference is greater than the third preset value, determine the transmission environment of the channel is NLOS.

9. The apparatus according to claim 7, wherein, before the locating, by the positioning apparatus, the terminal device based on positioning measurement information of the target channel, the positioning apparatus obtains positioning measurement information of at least one channel in the plurality of channels, wherein the at least one channel comprises the target channel.

10. The apparatus according to claim 9, wherein before the obtaining, by the positioning apparatus, positioning measurement information of at least one channel, the positioning apparatus: sends, by the transceiver of the positioning apparatus, a second request message to the terminal device or a network device corresponding to each of the at least one channel, wherein the second request message is used to request a location of the terminal device; and obtains positioning measurement information of at least one channel in the plurality of channels by: receiving, by the transceiver of the positioning apparatus, a second feedback message from the terminal device or the network device corresponding to each of the at least one channel, wherein the second feedback message carries positioning measurement information of each of the at least one channel.

11. The apparatus according to claim 7, wherein, the determining, by the positioning apparatus, a target channel from the plurality of channels based on the information about the transmission environment of each channel comprises: determining, by the positioning apparatus, a channel in the plurality of channels whose transmission environment is LOS as the target channel.

12. The apparatus according to claim 7, wherein, the determining, by the positioning apparatus, a target channel from the plurality of channels based on the information about the transmission environment of each channel comprises: determining, by the positioning apparatus, a channel in the plurality of channels whose transmission environment is near LOS as the target channel.

* * * * *